(12) United States Patent
Koizumi

(10) Patent No.: US 10,074,189 B2
(45) Date of Patent: Sep. 11, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tatsuro Koizumi, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/401,789

(22) Filed: Jan. 9, 2017

(65) Prior Publication Data
US 2017/0206667 A1 Jul. 20, 2017

(30) Foreign Application Priority Data

Jan. 20, 2016 (JP) .................. 2016-009159

(51) Int. Cl.
| | |
|---|---|
| G06K 9/00 | (2006.01) |
| G06T 7/246 | (2017.01) |
| G06T 5/20 | (2006.01) |
| H04N 5/232 | (2006.01) |

(52) U.S. Cl.
CPC ............... *G06T 7/248* (2017.01); *G06T 5/20* (2013.01); *H04N 5/23264* (2013.01); *G06T 2207/10016* (2013.01)

(58) Field of Classification Search
USPC ........................................................ 382/103
See application file for complete search history.

(56) References Cited

U.S. PATENT DOCUMENTS

| | | | |
|---|---|---|---|
| 6,335,985 B1* | 1/2002 | Sambonsugi | G06K 9/3241 |
| | | | 382/190 |
| 2002/0080882 A1* | 6/2002 | Kitagawa | H04N 19/51 |
| | | | 375/240.29 |
| 2010/0194851 A1* | 8/2010 | Pasupaleti | G06T 3/4038 |
| | | | 348/36 |

FOREIGN PATENT DOCUMENTS

| | | |
|---|---|---|
| JP | 3-95686 A | 4/1991 |
| JP | 2012182625 A | 9/2012 |

OTHER PUBLICATIONS

Horn, Berthold K.P. "Determining Optical Flow." Artificial Intelligence Laboratory journal, 1981, pp. 185-203, vol. 7, North-Holland Publishing Co., Amsterdam, Netherlands.

* cited by examiner

*Primary Examiner* — Alex Liew
(74) *Attorney, Agent, or Firm* — Canon U.S.A., Inc. IP Division

(57) ABSTRACT

An image processing apparatus includes an acquisition unit, a first calculation unit, a combination unit, a second calculation unit, and a correction unit. The acquisition unit acquires a plurality of pieces of image data captured sequentially in time series. The first calculation unit calculates a first displacement between one piece of image data among the plurality of pieces of image data and a piece of image data adjacent in time series to the one piece of image data. The combination unit combines a plurality of first displacements to obtain a second displacement between the one piece of image data and a piece of image data neighboring the one piece of image data in time series. The second calculation unit calculates a correction amount for the one piece of image data based on the second displacement. The one piece of image data is corrected based on the calculated correction amount.

15 Claims, 13 Drawing Sheets

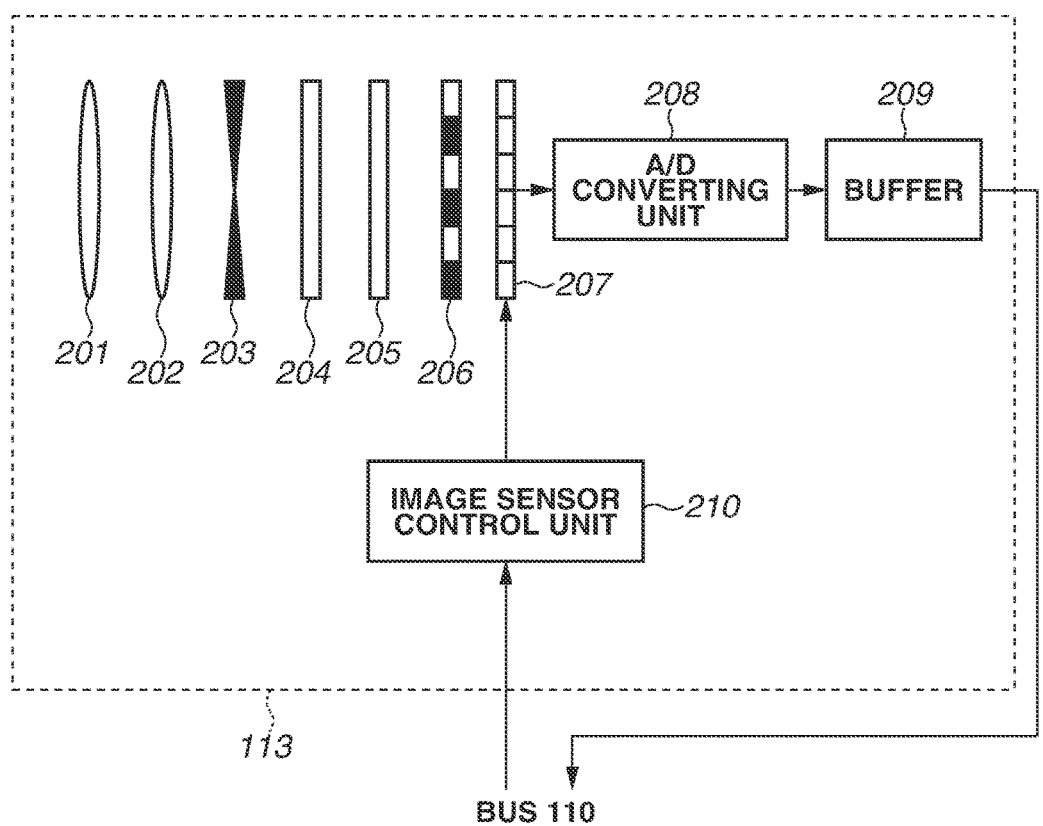

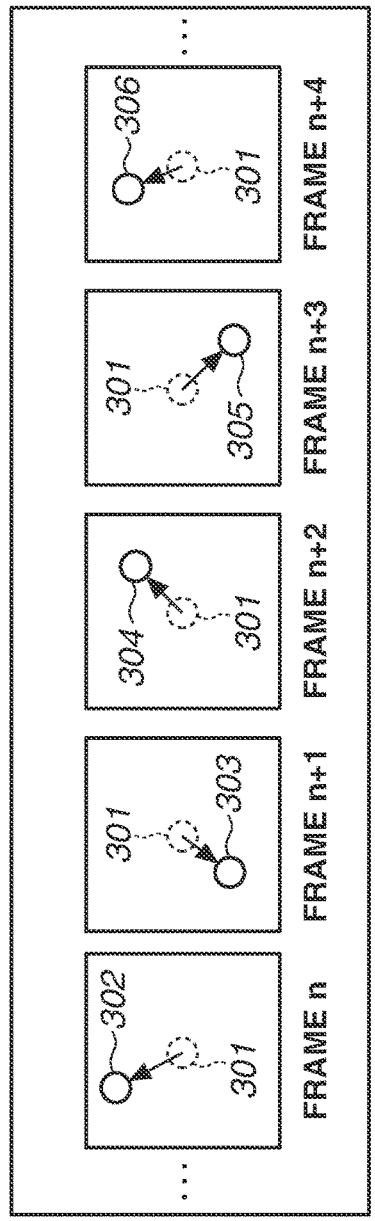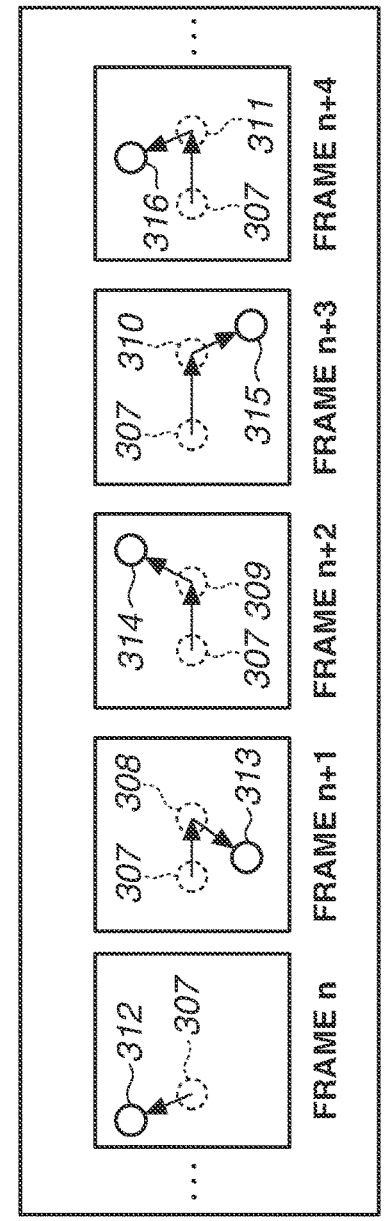

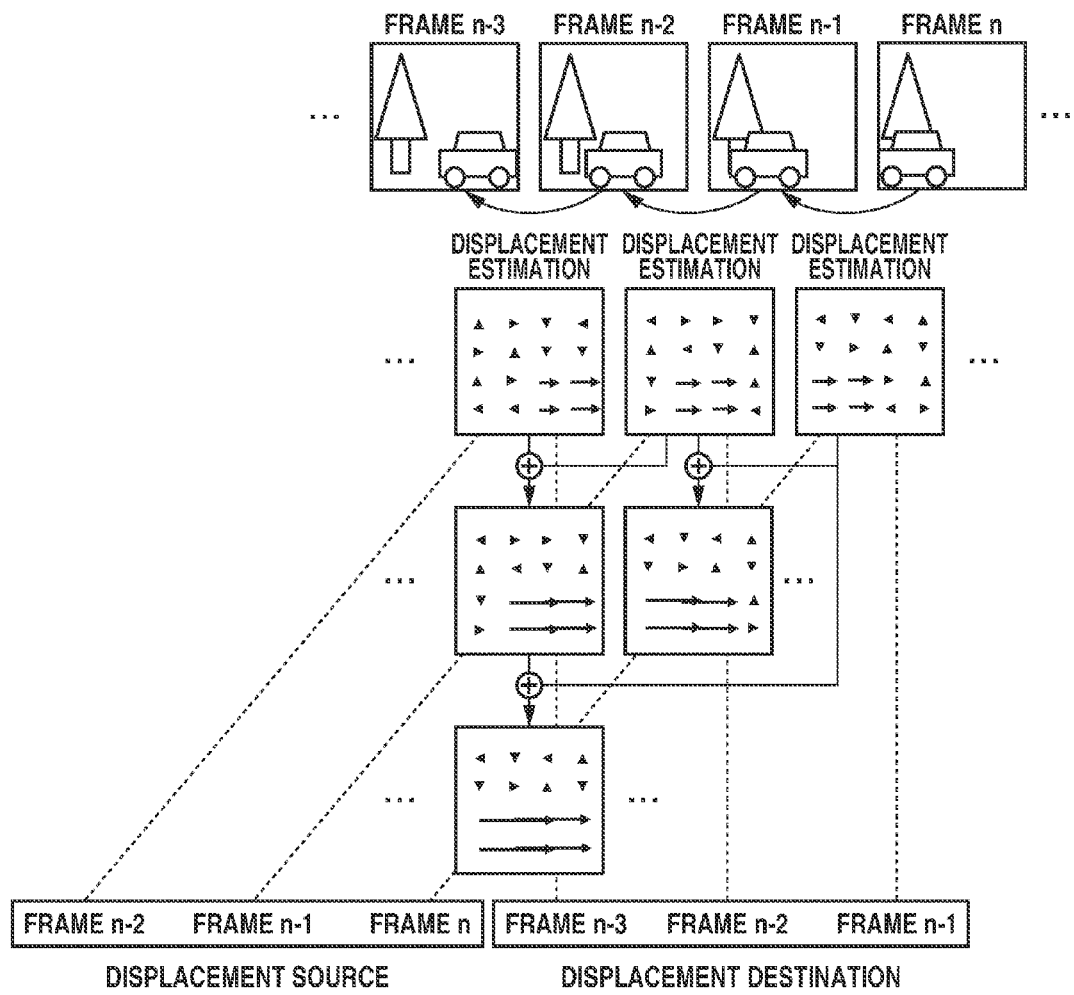

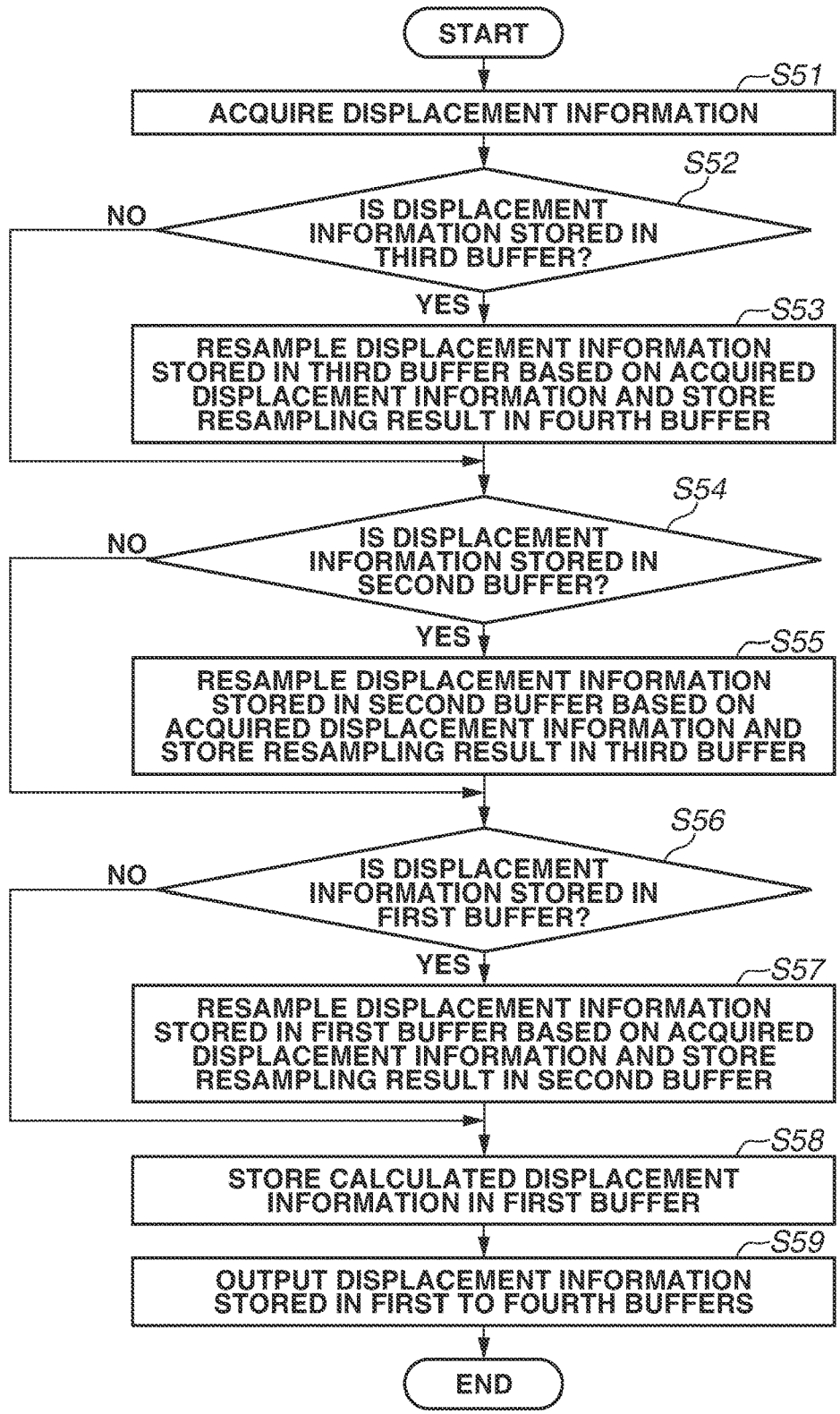

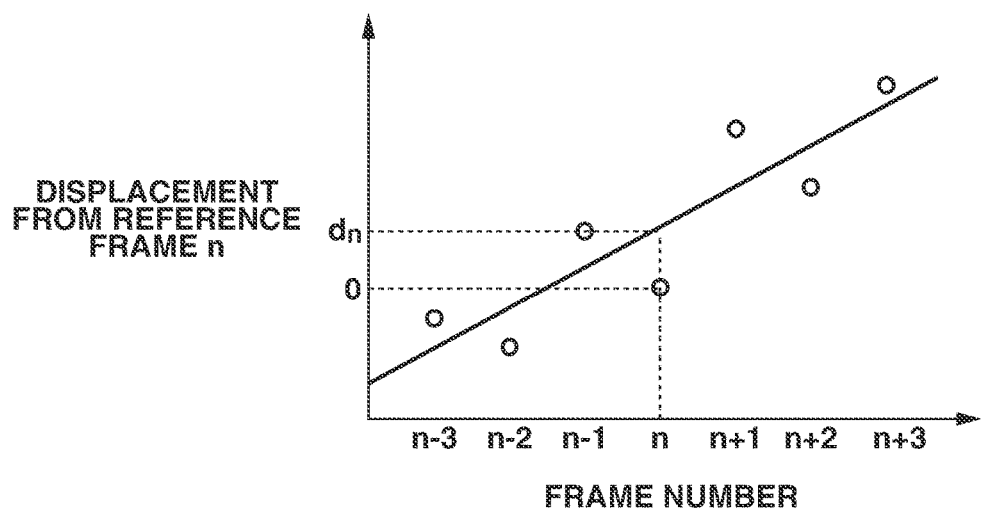
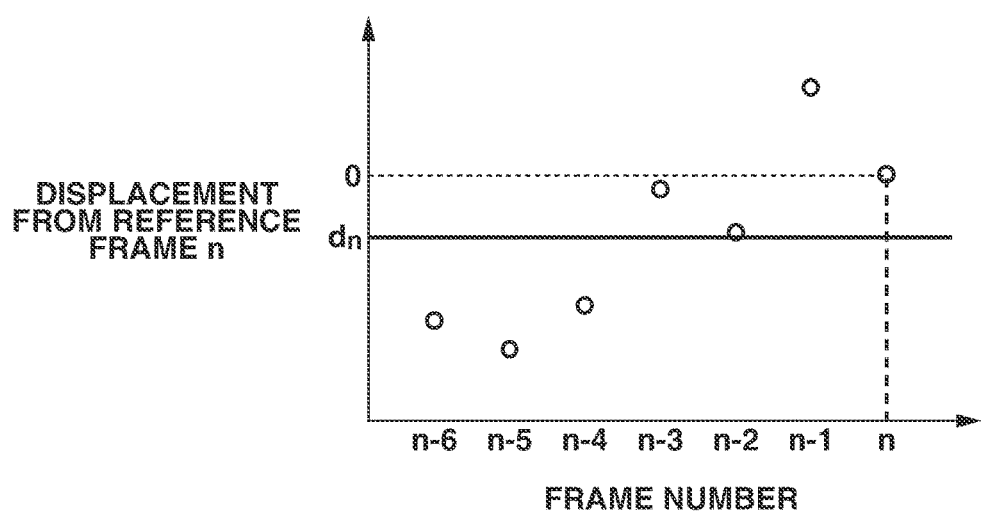

IMAGE PROCESSING APPARATUS, IMAGE PROCESSING METHOD, AND STORAGE MEDIUM

BACKGROUND OF THE INVENTION

Field of the Invention

Disclosed features relate to a technique for an image processing apparatus to correct an image deformation caused by an atmospheric fluctuation or the like.

Description of the Related Art

When a moving image is captured with a video camera, a monitoring camera, or the like, the captured video image may fluctuate due to an influence of an atmospheric fluctuation. The video image fluctuation is a phenomenon that occurs as a result of random refraction of light beams due to a non-uniform atmospheric temperature distribution and a non-uniform atmospheric density distribution, and changes therein. The video image fluctuation leads to an irregular deformation of the shape of a subject in the captured video image both spatially and temporally from the normal shape of the subject. Such a fluctuation phenomenon is a cause for decrease in the visibility of the video image. The fluctuation phenomenon also is a cause for erroneous detection in a monitoring camera system that automatically detects a predetermined subject. Thus, the fluctuation is desired to be corrected.

Japanese Patent Application Laid-Open No. 2012-182625 discusses, as a technique for correcting a fluctuation in a video image, a method in which a mean filter or a median filter of a plurality of time-series frames is applied to respective pixel values of pixels in a video image. When deformation of a subject occurs as a result of the aforementioned video image fluctuation, respective points on the subject are moved randomly in the video image. Destinations of the moved points are considered to have a distribution centered on positions where those points are supposed to appear. Thus, a pixel located at a position where a point of interest is supposed to appear is likely to have a pixel value of the point of interest. As such, the technique discussed in Japanese Patent Application Laid-Open No. 2012-182625 employs time-series filtering processing to acquire an image with no fluctuation.

Further, Japanese Patent Application Laid-Open No. 03-095686 discusses a method in which a fluctuation in a video image is extracted as a motion vector between images, the extracted motion vector is traced to obtain a center of the fluctuation, and a pixel that is an origin of the fluctuation is rearranged at the center position. In this way, a normal position where a point is supposed to appear is estimated. According to the technique discussed in Japanese Patent Application Laid-Open No. 03-095686, the fluctuation is corrected by transforming the shape of a subject in such a manner that respective points in the video image are moved toward the obtained normal positions of the points.

However, in a case where a video image (a plurality of pieces of image data captured sequentially in time series) includes a moving subject, the fluctuation correction techniques discussed in Japanese Patent Application Laid-Open Nos. 2012-182625 and 03-095686 cause a deterioration in image quality of a region where the moving subject exists (also referred to as "moving region").

SUMMARY OF THE INVENTION

An embodiment is directed to image processing by which a fluctuation can be eliminated while deterioration in image quality is prevented, even in a case where a video image includes a moving subject.

According to an aspect of the present invention, an image processing apparatus includes an acquisition unit configured to acquire a plurality of pieces of image data captured sequentially in time series, a first calculation unit configured to calculate a first displacement between one piece of image data among the plurality of pieces of image data and a piece of image data adjacent in time series to the one piece of image data, a combination unit configured to combine a plurality of first displacements to obtain a second displacement between the one piece of image data and a piece of image data neighboring the one piece of image data in time series, a second calculation unit configured to calculate a correction amount for the one piece of image data based on the second displacement, and a correction unit configured to correct the one piece of image data based on the calculated correction amount.

Further features of the present invention will become apparent from the following description of embodiments with reference to the attached drawings.

BRIEF DESCRIPTION OF THE DRAWINGS

FIG. 2 is a block diagram illustrating an example of a configuration of an image capturing unit.

FIGS. 3A and 3B schematically illustrate displacement of an image due to a fluctuation.

FIG. 5 schematically illustrates the calculation principle of displacements of neighborhood frames.

FIG. 11 illustrates a flow of displacement combining processing.

FIGS. 12A and 12B illustrate a method of filtering displacements according to a first modified example.

DESCRIPTION OF THE EMBODIMENTS

Embodiments will be described in detail below with reference to the attached drawings.

The embodiments described below are examples and can be modified and changed as appropriate according to the configuration of an apparatus to which an embodiment is applied and various types of conditions, and the scope is not limited to the embodiments described below.

(Overall Configuration of Image Capturing Apparatus)

Figure 1:
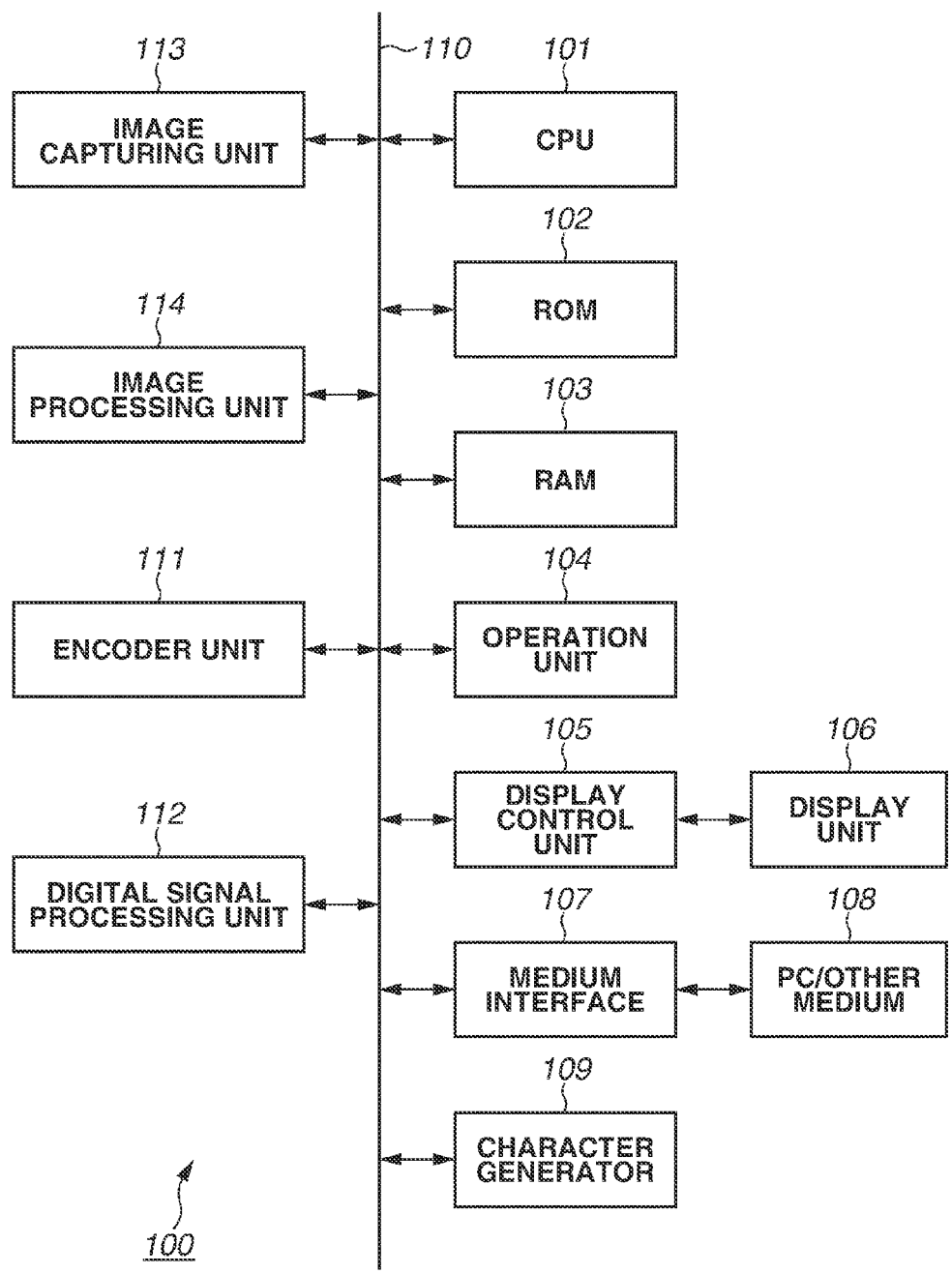
FIG. 1 is a block diagram illustrating an example of a configuration of an image capturing apparatus according to an embodiment.

FIG. 1 is a block diagram illustrating an example of a configuration of an image capturing apparatus 100 according to an embodiment. The following describes each component of the image capturing apparatus 100 with reference to FIG. 1.

An image capturing unit 113 repeats a process of converting an image formed by an optical system into image data with an image sensor, thereby capturing images sequentially in time series to acquire a plurality of pieces of image data. As used herein, "image data" is a still image and is sometimes referred to as an image. The plurality of pieces of image data sequential in time series is gathered to form a moving image (video image).

An image processing unit 114 performs fluctuation correction processing, which will be described below, on the plurality of pieces of image data acquired by the image capturing unit 113. A central processing unit (CPU) 101 is involved in processing of the respective components, sequentially reads instructions stored in a read-only memory (ROM) 102 or a random access memory (RAM) 103, interprets the read instructions, and executes processing according to the result of the interpretation. Programs and data for execution of processing in the image capturing apparatus 100 are stored in the ROM 102 and the RAM 103. Further, the RAM 103 may operate as a work area of the CPU 101.

A bus 110 is a path for transmitting and receiving data and processing instructions between the components illustrated in FIG. 1. An operation unit 104 is a unit with which a user operates the image capturing apparatus 100. The operation unit 104 includes buttons and mode dials to be operated by a user. Further, the operation unit 104 may include a touch screen or touch panel to be touched by a user and a key operation unit to be pressed by a user. The operation unit 104 acquires user instructions input by a user via the buttons or the like.

A character generator 109 is a unit configured to generates characters, graphics, and the like.

A display unit 106 may be realized by, for example, a liquid crystal display and displays captured image data and characters received from a display control unit 105. Further, the display unit 106 displays characters and graphics generated by the character generator 109. Further, the display unit 106 may include a touch screen function. In this case, a touch screen instruction given to the display unit 106 by a user may be treated as input to the operation unit 104.

A digital signal processing unit 112 performs processing such as adjustment of luminance values of image data acquired by the image capturing unit 113 and interpolation of defective pixels. The foregoing processing that the digital signal processing unit 112 executes may be performed prior to the processing performed by the image processing unit 114.

An encoder unit 111 executes encoding processing on corrected image data generated as a result of the fluctuation correction processing executed by the image processing unit 114. A medium interface 107 is an interface for connecting to a personal computer (PC)/other medium 108. Examples of a unit that can be used as the PC/other medium 108 include a hard disk, memory card, Compact Flash (CF) card, Secure Digital (SD) card, and universal serial bus (USB) memory, and any unit on which data can be stored may be used. Image data encoded by the encoder unit 111 may be output to the PC/other medium 108 via the medium interface 107.

The image capturing apparatus 100 may further include a component other than the foregoing components, but such a component has no direct relation to the present embodiment, so description of such a component is omitted.
(Configuration of Image Capturing Unit 113)

FIG. 2 is a block diagram illustrating a configuration of the image capturing unit 113 in detail. The following describes an example of the configuration of the image capturing unit 113 with reference to FIG. 2.

Lenses 201 and 202 form an imaging optical system. Light beams emitted from a subject are passed through a diaphragm 203, an infrared (IR) cut filter 204, a low-pass filter 205, and a color filter 206 by the imaging optical system and then form an image on the image sensor 207. The foregoing configuration of the optical system is a mere example simplified for illustration, and the optical system may have any configuration having a function of forming an image of a subject on the image sensor 207. Further, while the configuration for acquiring color images is described in the present embodiment, images to be acquired may be various images such as monochrome images, images having pixels that four or more colors are detected, and images in which respective pixels are exposed differently. Further, a mechanism such as an automatic focusing mechanism and a zooming mechanism may be included in addition to the optical system illustrated in FIG. 2.

The image sensor 207 and an analog/digital (A/D) converting unit 208 may be realized by image sensors such as complementary metal oxide semiconductor (CMOS) image sensors. The image sensor 207 may include a substrate and pixels arranged in the form of a two-dimensional grid on the substrate, and converts an image formed on the image sensor 207 into analog electric signals. The A/D converting unit 208 converts information about the image converted into the analog electric signals into digital signals. An image sensor control unit 210 receives instructions relating to image-capturing from the CPU 101 via the bus 110. The image sensor control unit 210 controls the image sensor 207 according to the received instructions to execute image capturing. Information about the image converted into the digital signals is stored as image data (image frame) in a buffer 209.

The image capturing is successively performed, and the pieces of image data are sequentially supplied to the image processing unit 114 via the bus 110.
(Principle of Fluctuation Correction)

The image capturing apparatus 100 according to the present embodiment corrects fluctuations based on displacements between images. The following describes the principle of the correction.

FIGS. 3A and 3B schematically illustrate how displacement occurs between images included in a moving image due to fluctuation occurred in the moving image. Input on which the fluctuation correction processing is to be executed by the image capturing apparatus 100 is time-series image data including a moving image or successive still images. As used herein, such image data will be referred to as "frame", and the frames are specified as a frame n, frame n+1, frame n+2, frame n+3, frame n+4 . . . in time-series order, where n is a natural number.

FIG. 3A illustrates displacements in a still region. First, a normal position 301 where a point of interest on a subject appears in a case where there is no fluctuation is specified by a dashed-line circle in respective frames illustrated in FIG. 3A. Further, in FIG. 3A, positions 302, 303, 304, 305, and 306 where the point of interest actually appears are respectively specified by a solid-line circle in frames n, n+1, n+2, n+3, and n+4. As described above, although the point of interest is supposed to appear in the normal position 301, since the position of the point of interest is changed due to the fluctuation, the point of interest appears in the various positions 302 to 306 in the respective frames. The "displacement" refers to the amount by which a pixel on image data is displaced (moved), and information indicating the displacement amount will be referred to as displacement information or as displacement.

FIG. 3B illustrates displacements in a moving region.

First, normal positions 307, 308, 309, 310, and 311 where a point of interest on a subject appears in a case where there is no fluctuation are specified by dashed-line circles in respective frames n, n+1, n+2, n+3, and n+4 in FIG. 3B. The normal positions 307, 308, 309, 310, and 311 are moved rightward as the frame goes on (as the time passes). Further, in FIG. 3B, positions 312, 313, 314, 315, and 316 where the point of interest actually appears are respectively specified by solid-line circles in the frames n, n+1, n+2, n+3, and n+4.

As described above, although the point of interest is supposed to appear in the normal positions 307, 308, 309, 310, and 311, since the position of the point of interest is changed due to the fluctuation, the point of interest appears in the various positions 312, 313, 314, 315, and 316 in the respective frames.

In the present embodiment, the position change due to the fluctuation is considered as a random movement, and fitting is performed using a predetermined function to thereby estimate the normal position in the case where there is no fluctuation.

Figure 4A:
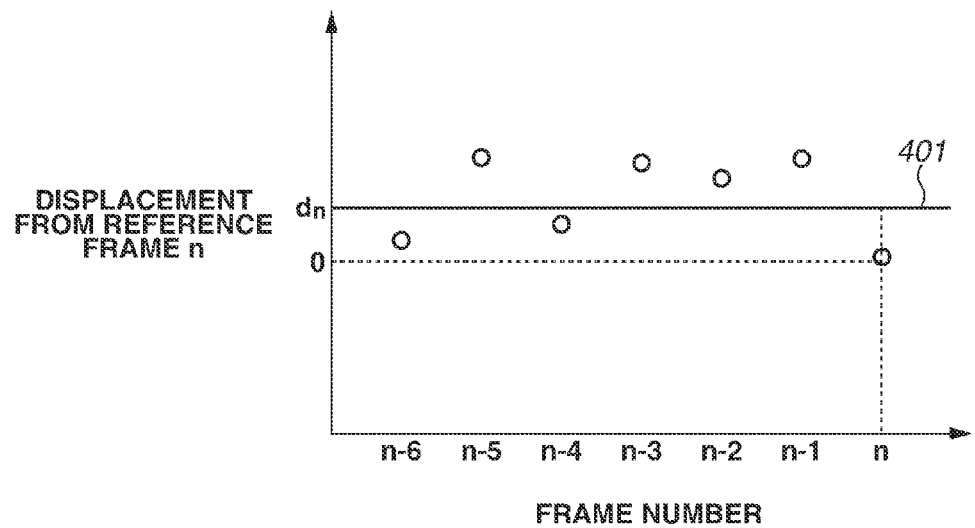
FIGS. 4A and 4B illustrate the principle of fluctuation correction by filtering displacements.
Figure 4B:
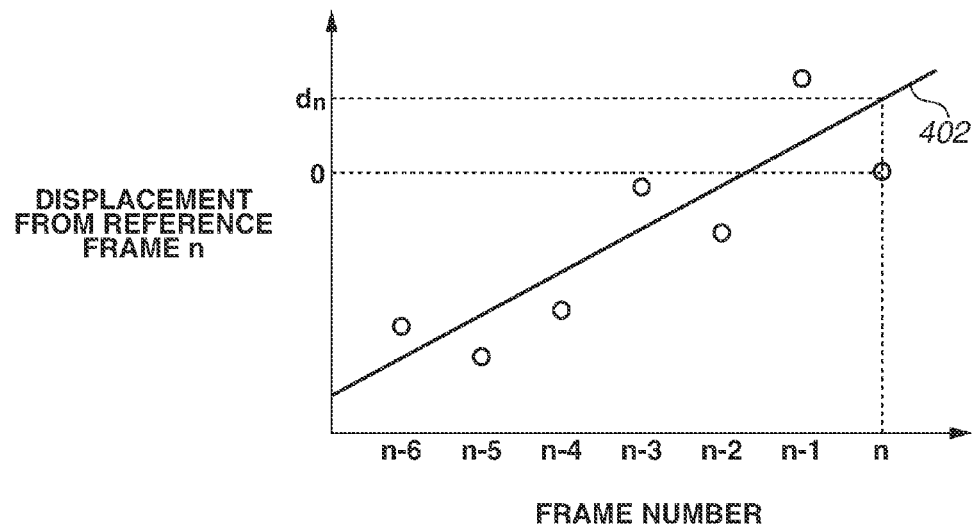

FIGS. 4A and 4B each illustrate an example of normal position estimation processing by fitting according to the present embodiment. In FIG. 4A, positions where a point of interest on a subject appears in frames n−6 to n in the case of the still region are plotted as displacements from the position in the frame n as a reference (0).

In the present embodiment, the normal position is estimated based on the fitting of a relationship between time and displacement to a linear function.

A horizontal solid line 401 in a graph in FIG. 4A illustrates a result of fitting, and a vertical axis value of the horizontal solid line 401 (displacement from reference frame n) indicates an estimated normal position of the point of interest.

In FIG. 4A, it is assumed that the point of interest is located in the still region, so the normal position does not move between the frames, and the result of fitting is substantially the horizontal solid line 401. In FIG. 4A, the fluctuation of the point of interest in the frame n can be corrected by moving the pixel position by $d_n$. The normal position estimation by fitting and the correction are performed on each pixel of a frame image that is a correction target, whereby fluctuations in images in the video image can be corrected.

In FIG. 4B, the positions where the point of interest on a subject appears in frames n−6 to n in the case of the moving region are plotted as displacements from the position in the frame n as a reference (0).

An oblique solid line 402 in a graph in FIG. 4B illustrates a result of fitting, and a vertical axis value of the oblique solid line 402 (displacement from reference frame n) indicates an estimated normal position of the point of interest. In the example illustrated in FIG. 4B, it is assumed that the point of interest is located in the moving region, so the normal position obtained by fitting is the oblique solid line 402 reflecting the movement of the point of interest. Even in this case, the fluctuation of the point of interest in the frame n can be corrected by moving the pixel position by $d_n$.

In the present embodiment, the normal position corresponding to the case where there is no fluctuation is estimated based on the fitting as described above. To execute the normal position estimation, displacement information about displacements between the frames in the neighborhood of the frame n that is the correction target is needed as described above. In the present embodiment, the displacement information about displacements between the frames in the neighborhood is calculated based on registration between a correction target frame and a frame adjacent to the correction target frame.

As used herein, the term "frames in the neighborhood" refers to a plurality of frames temporally previous and subsequent to the frame of interest. The frames in the neighborhood may be a plurality of previous frames only, a plurality of subsequent frames only, or a plurality of previous and subsequent frames with the frame of interest being the center.

(Calculation of Displacement Information)

FIG. 5 illustrates the concept of calculation of displacement information. In the present embodiment, first, a displacement between adjacent frames is calculated (estimated) by registration. Next, the displacements between the frames are sequentially combined to thereby calculate a displacement between a frame of interest and a frame located in the neighborhood of the frame of interest.

In FIG. 5, the first line from the top illustrates respective frame images, and the second line from the top illustrates displacements between the adjacent frames illustrated in the first line. The second line from the top in FIG. 5 indicates that displacements from the frame n to the frame n−1, from the frame n−1 to the frame n−2, and from the frame n−2 to the frame n−3 are calculated first by registration.

Next, in the third line from the top, the displacements are combined to calculate the amount of displacement between a frame and a second adjacent frame. For example, the third line from the top in FIG. 5 indicates that the displacements from the frame n to the frame n−1 and from the frame n−1 to the frame n−2 are combined to calculate a displacement from the frame n to the frame n−2. The third line illustrates a case in which the amount of displacement increases as a result of the combining.

Similarly, the displacements from the frame n−1 to the frame n−2 and from the frame n−2 to the frame n−3 are combined (connected) to calculate a displacement from the frame n−1 to the frame n−3. Further, the displacements from the frame n to the frame n−2 and from the frame n−2 to the frame n−3 are combined (connected) to calculate a displacement from the frame n to the frame n−3. The combined amount of displacement is specified in the fourth line from the top.

In the present embodiment, as described above, adjacent frames are registered to calculate (estimate) a displacement between the adjacent frames, and the obtained displacements are combined (connected). In this way, even in a case of a scene including a moving subject, a displacement between a frame of interest and a frame in the neighborhood of the frame of interest can be obtained with high accuracy.

Then, in the present embodiment, fitting is performed on the displacements of the neighborhood frames so that even in the case of a scene including a moving subject, only a fluctuation can be corrected while the movement of the moving subject is retained.

(Configuration and Processing of Image Processing Unit 114)

Figure 6:
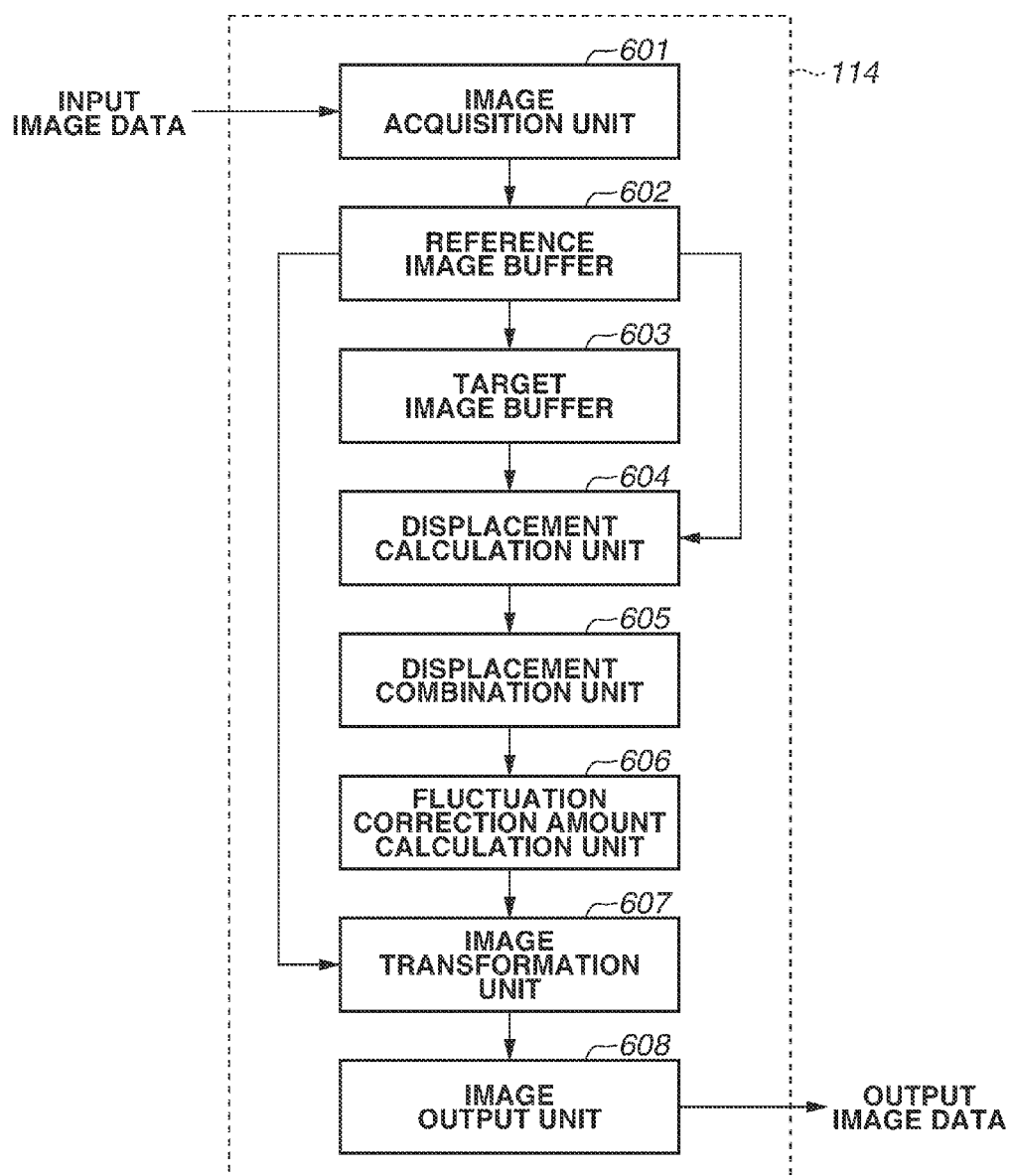
FIG. 6 is a block diagram illustrating an example of a configuration of an image processing unit according to an embodiment.

FIG. 6 is a block diagram illustrating an example of a configuration of the image processing unit 114. The following describes the example of the configuration of the image processing unit 114 with reference to FIG. 6.

An image acquisition unit 601 (acquisition device) acquires one by one via the bus 110 the plurality of pieces of input image data captured sequentially in time series by the image capturing unit 113, and sequentially stores the acquired input image data in a reference image buffer 602. The plurality of pieces of input image data is a plurality of pieces of input image data captured at successive times (at different timings), and the plurality of pieces of input image data is gathered together to form a video image.

The reference image buffer 602 holds image data of one frame acquired by the image acquisition unit 601. When new image data is stored in the reference image buffer 602, the reference image buffer 602 transmits the previously-held image data to a displacement calculation unit 604 and an image transformation unit 607 and stores the previously-held image data in a target image buffer 603. The image data held by the reference image buffer 602 will be referred to as "reference image data".

The target image buffer 603 holds image data of one frame supplied from the reference image buffer 602. When new image data is stored in the target image buffer 603, the target image buffer 603 transmits the previously-held image data to the displacement calculation unit 604. The image data held by the target image buffer 603 will be referred to as "target image data".

The displacement calculation unit 604 (first calculation unit) calculates a displacement (first displacement) from the image data (reference image data) acquired from the reference image buffer 602 to the image data (target image data) acquired from the target image buffer 603. In other words, the displacement calculation unit 604 calculates a displacement between first image data and second image data chronologically adjacent to the first image data.

The reference image data is image data that is used as a reference in the displacement calculation, and the target image data is image data that is a target of the displacement calculation. Specifically, the displacement calculation unit 604 (first calculation unit) obtains a correspondence between a pixel on the reference image data and a position on the target image data by registration of image data and adjacent image data, and calculates a displacement (first displacement) of the pixel position as displacement information.

A displacement combination unit 605 (combination device) calculates a displacement (second displacement) between the latest reference image data and each of a predetermined number of neighborhood frames and holds the calculated displacements. The number of frames held by the displacement combination unit 605 (combination device) is determined by the number of frames used in the processing performed by a fluctuation correction amount calculation unit 606 (second calculation unit).

In the present embodiment, the fluctuation correction amount calculation unit 606 uses displacement information about neighborhood frames of, for example, four previous frames with respect to the latest reference image data. The neighborhood frames may be N frames selected in increasing order of time from the reference image data, where N is an integer. While the case where N=4 is described as an example in the present embodiment, N may be any other number. Further, while the case where four previous frames in increasing order of time are selected is described as an example in the present embodiment, N subsequent frames in increasing order of time may be included.

When new displacement information is supplied from the displacement calculation unit 604 to the displacement combination unit 605, the displacement combination unit 605 combines the displacement information held by the displacement combination unit 605 with the new displacement information and converts the previously-held displacement information into displacement information based on the latest reference image data as a reference. The displacement combination unit 605 transmits the converted displacement information to the fluctuation correction amount calculation unit 606.

The fluctuation correction amount calculation unit 606 (second calculation unit) performs fitting of a relationship between time and displacement amount to a predetermined function based on the displacement information input from the displacement combination unit 605. In this way, the fluctuation correction amount calculation unit 606 calculates a fluctuation correction amount for acquiring a normal position for each pixel on the latest reference image data. In other words, the fluctuation correction amount calculation unit 606 (second calculation unit) calculates a correction amount for the reference image data (one piece of image data) based on the displacement (second displacement) obtained by the displacement combination unit 605.

The image transformation unit 607 (correction unit) performs resampling processing on the latest input image data (the reference image data supplied from the reference image buffer 602) based on the fluctuation correction amount calculated by the fluctuation correction amount calculation unit 606. The image transformation unit 607 performs the resampling processing to transform the input image data and generate image data the fluctuation of which is corrected by the fluctuation correction amount. Specifically, the image transformation unit 607 (correction unit) corrects the reference image data (one piece of image data) based on the calculated fluctuation correction amount.

The resampling processing can be executed by, for example, assigning original pixel values to the nearest pixels and then performing interpolation. Alternatively, the resampling processing can be executed using a method in which weighted original pixel values are assigned to pixels in the neighborhood of a position to be corrected and then divided by a weight sum. The resampling processing can be executed using any other method. The image transformation unit 607 (correction unit) may execute the image transformation using any method in which an image is deformed based on the fluctuation correction amount calculated by the fluctuation correction amount calculation unit 606.

An image output unit 608 outputs the corrected image data generated by the image transformation unit 607 via the bus 110.

(Processing Performed by Image Processing Unit 114)

Figure 7:
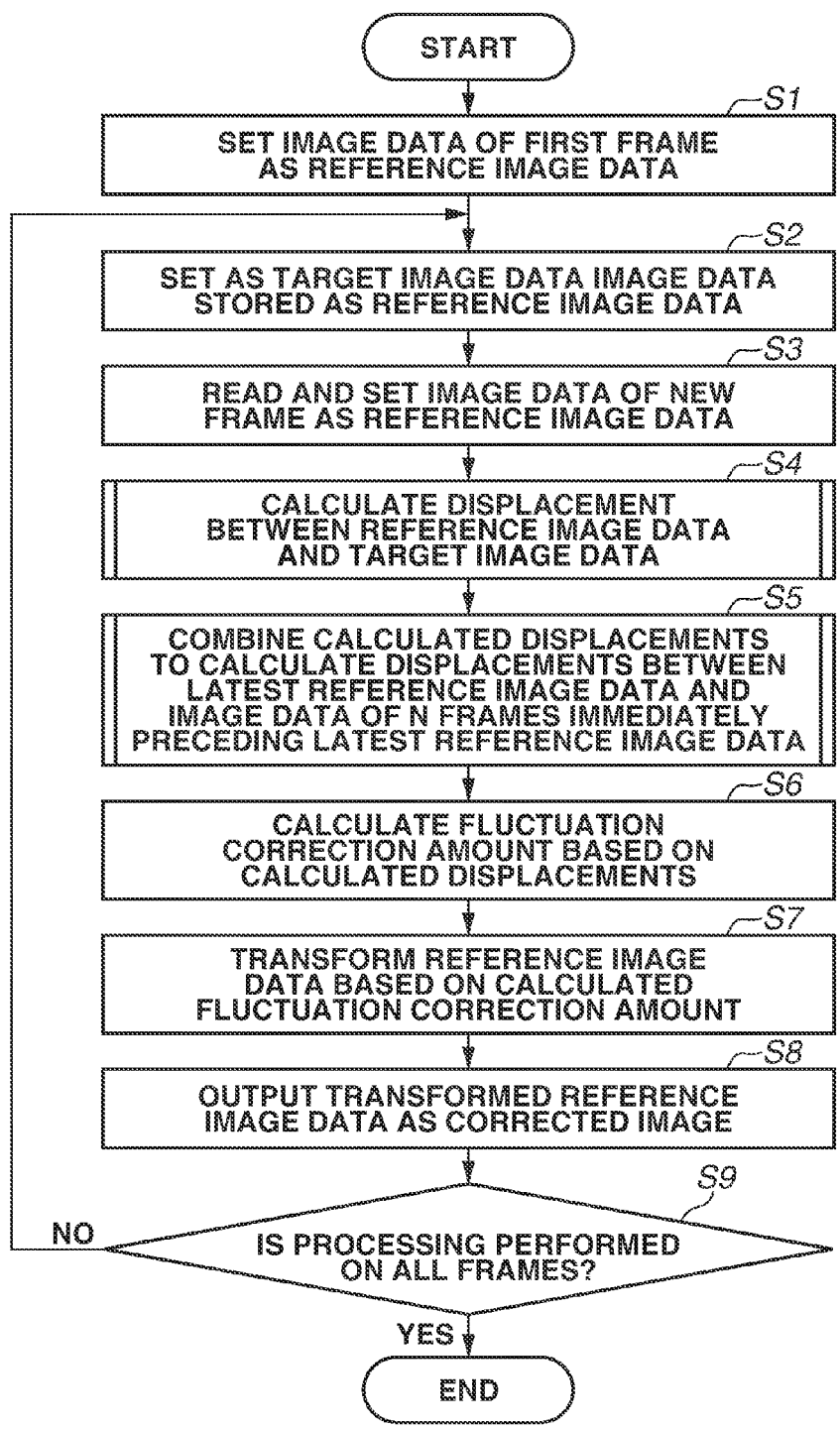
FIG. 7 illustrates a flow of image processing according to an embodiment.

FIG. 7 is a flow chart illustrating an example of processing performed by the image processing unit 114. The following describes the example of the processing performed by the image processing unit 114 with reference to the flow chart. A CPU in the image processing unit 114 may realize the process performed by the image processing unit 114 by executing a predetermined program, or an image processing processor including an application specific integrated circuit (ASIC) may execute the process.

In step S1, the image acquisition unit 601 (acquisition device) acquires image data of a first frame in input image data and stores the acquired image data as reference image data for registration in the reference image buffer 602.

In step S2, the target image buffer 603 receives the image data (reference image data) stored in the reference image buffer 602 and stores the received image data as target image data in the target image buffer 603.

In step S3, the image acquisition unit 601 acquires image data of a new frame and stores the acquired image data as reference image data in the reference image buffer 602.

In step S4, the displacement calculation unit 604 calculates displacement information about a displacement between the target image data stored in step S2 and the reference image data stored in the reference image buffer 602 in step S3 by registration of the target image data and the reference image data.

In step S5, the displacement combination unit 605 combines the plurality of pieces of displacement information calculated in step S4 to calculate displacement information about the displacements between the reference image data stored in step S3 and image data of the neighborhood frames. Specifically, the displacement combination unit 605 calculates displacement information about displacements of image data of N previous frames. While N is, for example, a positive integer in the present embodiment, a positive integer that is, for example, not smaller than two can be selected.

In step S6, first, the fluctuation correction amount calculation unit 606 performs fitting of a relationship between time (each frame) and displacement amount to a function based on the displacement information calculated in step S5. Next, the fluctuation correction amount calculation unit 606 calculates a fluctuation correction amount for the correction of a pixel on the reference image data to a normal position in the case where there is no fluctuation, based on the fitting result.

In step S7, the image transformation unit 607 transforms the reference image data stored in the reference image buffer 602 based on the correction amount calculated in step S6.

In step S8, the image output unit 608 outputs via the bus 110 the corrected image data transformed by the image transformation unit 607 in step S7.

(Configuration and Processing of Displacement Calculation Unit 604)

The following describes the configuration of the displacement calculation unit 604 and processing executed by the displacement calculation unit 604. As described above, the displacement calculation unit 604 calculates a displacement from image data that is a reference for registration (reference image data) to image data that is a target (target image data).

In the present embodiment, the displacement calculation unit 604 calculates a displacement between the target image data and the reference image data using, for example, a Horn-Schunck method. The Horn-Schunck method is discussed in, for example, "Horn, B. K. P. and Schunck, B. G. (1981). Determining Optical Flow. Artificial Intelligence, 17:185-203". In the Horn-Schunck method, displacements u and v with which an energy function E represented by formula (1) below is minimized are obtained by repeat computations. In formula (1) below, $I_x$ and $I_y$ are differentials of pixel values of the reference image data in x- and y-directions, respectively, and $I_t$ is a change in luminance between two images for which a displacement is to be calculated.

[Formula (1)]

$$E = \iint [(I_x u + I_y v + I_t)^2 + \alpha^2 (\|\nabla u\|^2 + \|\nabla v\|^2)] dx dy \quad (1)$$

The first term in the integral in formula (1) is a term obtained by expanding to first order a condition that pixel values between images for which a displacement is to be calculated are constant, and the second term is a regularization term representing a condition that a change in displacement is continuous. Further, α is a parameter for adjusting the intensity of regularization, and as α increases, the change in displacement becomes smoother.

When formula (1) is solved using the Euler-Lagrange equation, formula (2) below is obtained.

[Formula (2)]

$$I_x(I_x u + I_y v + I_t) - \alpha^2 \Delta u = 0 \quad I_y(I_x u + I_y v + I_t) - \alpha^2 \Delta v = 0 \quad (2)$$

When the Laplacians of the displacements u and v are represented as formula (3) and substituted into formula (2), formula (4) below is obtained, where "–" above u or v represents a weighted mean of u or v in the neighborhood regions.

[Formula (3)]

$$\Delta u = \bar{u} - u$$

$$\Delta v = \bar{v} - v \quad (3)$$

[Formula (4)]

$$(I_x^2 + \alpha^2) u + I_x I_y v = \alpha^2 \bar{u} - I_x I_t$$

$$I_x I_y u + (I_y^2 + \alpha^2) v = \alpha^2 \bar{v} - I_y I_t \quad (4)$$

Since Formula (4) includes the weighted means of the displacements in the neighborhood regions, u and v in all pixel positions have relevance, so there is difficulty in analytically solving formula (4). Thus, in the present embodiment, calculation of formula (5) below is repeated to obtain an approximate solution of formula (4). In formula (5), k is the number of times the calculation is repeated, and $u^k$ and $v^k$ are values of displacement in the k-th calculation.

[Formula (5)]

$$u^{k+1} = \bar{u}^k - \frac{I_x(I_x \bar{u}^k + I_y \bar{v}^k + I_t)}{\alpha^2 + I_x^2 + I_y^2} \quad (5)$$

$$v^{k+1} = \bar{v}^k - \frac{I_y(I_x \bar{u}^k + I_y \bar{v}^k + I_t)}{\alpha^2 + I_x^2 + I_y^2}$$

Figure 8:
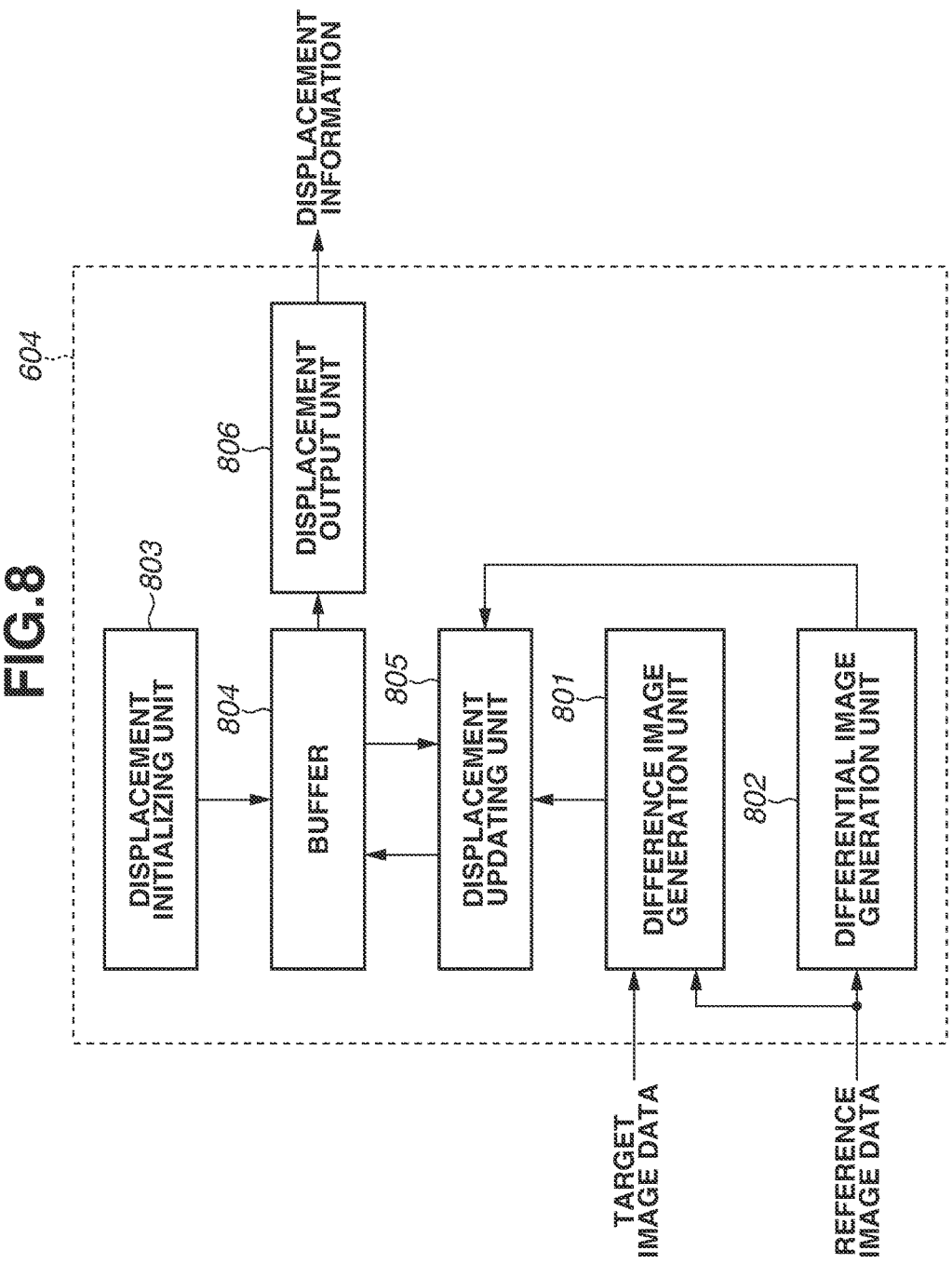
FIG. 8 is a block diagram illustrating an example of a configuration of a displacement calculation unit.

FIG. 8 is a block diagram illustrating the displacement calculation unit 604. The following describes an example of the configuration of the displacement calculation unit 604 with reference to FIG. 8.

A difference image generation unit 801 generates difference image data between the reference image data and the target image data. A value $I_{ti,j}$ of position (i, j) on the difference image data can be represented by formula (6) below and calculated, where $I_{i,j,0}$ is a pixel value of the position (i, j) on the reference image data, and $I_{i,j,1}$ is a pixel value of the position (i, j) on the target image data.

[Formula (6)]

$$I_{ti,j} = \frac{1}{4} \{ I_{i,j,1} - I_{i,j,0} + I_{i+1,j,1} - I_{i+1,j,0} + I_{i,j+1,1} - I_{i,j+1,0} + I_{i+1,j+1,1} - I_{i+1,j+1,0} \} \quad (6)$$

A differential image generation unit 802 generates differential image data of the reference image data in the x- and y-directions. The differential $I_{xi,j}$ with respect to x and the differential $I_{yi,j}$ with respect to y of the position (i, j) on the reference image data are calculated by formulas (7) and (8), respectively. In the present embodiment, a differential image is, for example, an image in which a pixel value is the calculated differential $I_{xi,j}$ with respect to x and the calculated differential $I_{yi,j}$ with respect to y.

[Formulas (7) and (8)]

$$I_{xi,j} = \frac{1}{4}\{I_{i,j+1,0} - I_{i,j,0} + I_{i+1,j+1,0} - I_{i+1,j,0} + I_{i,j+1,1} - I_{i,j,1} + I_{i+1,j+1,1} - I_{i+1,j,1}\} \quad (7)$$

$$I_{yi,j} = \frac{1}{4}(I_{i+1,j,0} - I_{i,j,0} + I_{i+1,j+1,0} - I_{i,j+1,0} + I_{i+1,i,j} - I_{i,j,1} + I_{i+1,j+1,1} - I_{i,j+1,1}\} \quad (8)$$

A displacement initializing unit 803 generates an initial value of the displacement information calculated by the repeat processing and stores the generated initial value in a buffer 804. In the present embodiment, for example, data without a displacement that u=0 and v=0 is used as the initial value of the displacement information. The buffer 804 is a buffer for storing displacement information being calculated during the repeat processing based on formula (5). A displacement updating unit 805 updates based on formula (5) the displacement information being calculated and stored in the buffer 804 based on the differential image data generated by the differential image generation unit 802 and the difference image data generated by the difference image generation unit 801.

A displacement output unit 806 outputs the displacement information stored in the buffer 804 when the predetermined number of times of repeat processing by the displacement updating unit 805 is completed.

Figure 9:
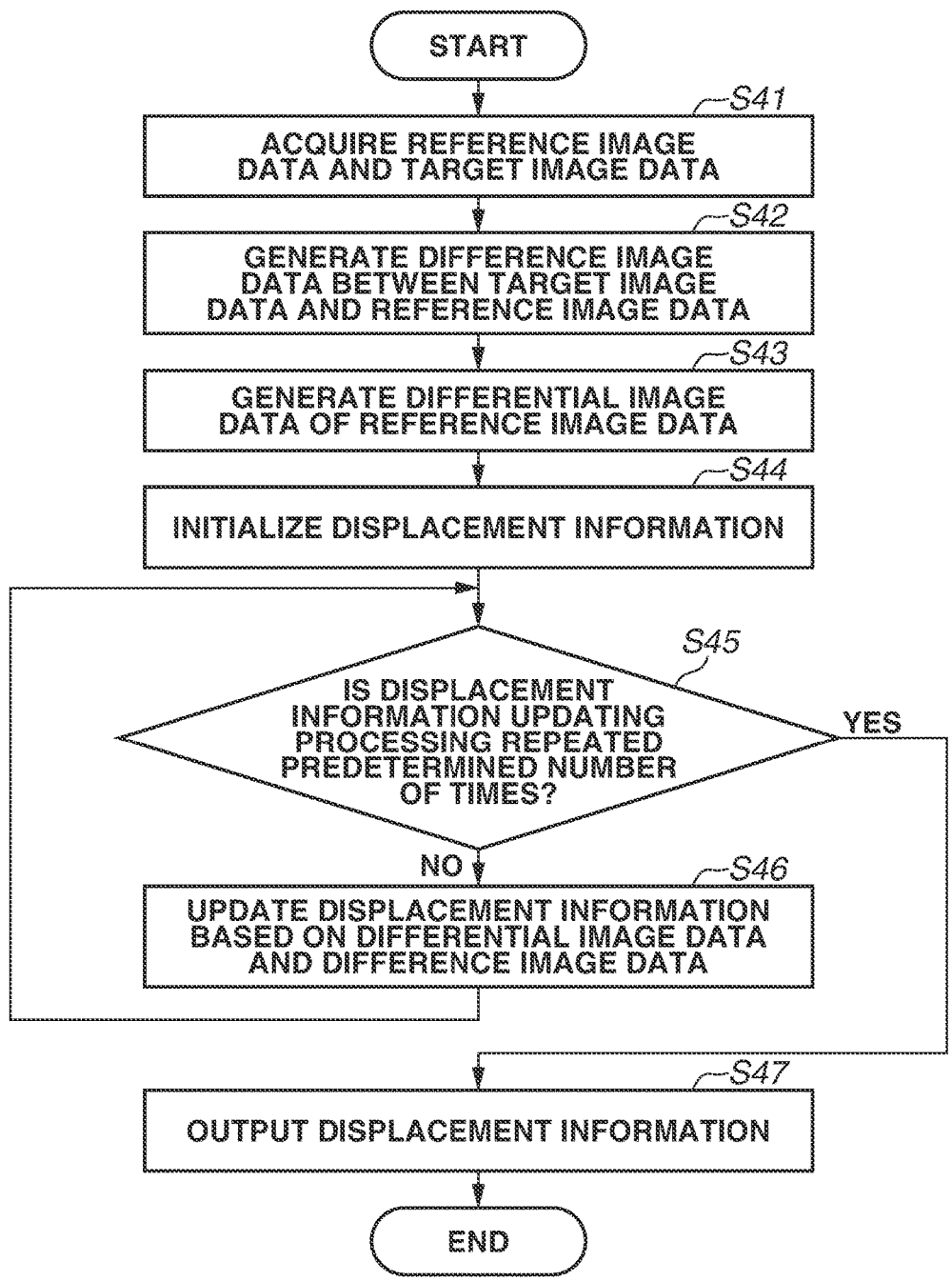
FIG. 9 illustrates a flow of displacement calculation processing.

FIG. 9 is a flow chart illustrating operations (displacement calculation processing) executed by the displacement calculation unit 604. The following describes an example of the displacement calculation processing with reference to the flow chart. A CPU in the image processing unit 114 may realize the operations of the displacement calculation unit 604 by executing a predetermined program, or an image processing processor including an ASIC may realize the operations.

In step S41, the displacement calculation unit 604 acquires the reference image data and the target image data. More specifically, the difference image generation unit 801 in the displacement calculation unit 604 acquires the reference image data and the target image data. Further, the differential image generation unit 802 acquires the target image data.

In step S42, the difference image generation unit 801 generates the difference image data between the target image data and the reference image data. The value of a pixel is calculated using formula (6).

In step S43, the differential image generation unit 802 generates the differential image data of the reference image data including the differentials with respect to x and y. The value of a pixel is calculated using formulas (7) and (8).

In step S44, the displacement initializing unit 803 initializes the displacement information and stores the initialized displacement information in the buffer 804. Specifically, the displacement initializing unit 803 stores in the buffer 804 data without a displacement in which the initial values are, for example, u=0 and v=0.

In step S45, the displacement updating unit 805 of the displacement calculation unit 604 determines whether the displacement information updating processing is repeated a predetermined number of times. If the displacement information updating processing is not repeated the predetermined number of times (NO in step S45), the processing proceeds to step S46. On the other hand, if the displacement information updating processing is repeated the predetermined number of times (YES in step S45), the processing proceeds to step S47. In the present embodiment, the number of times the processing is to be repeated is, for example, k times as described above.

In step S46, the displacement updating unit 805 updates the displacement information stored in the buffer 804 based on the difference image data generated in step S41 and the differential image data generated in step S42. At this time, the displacement updating unit 805 executes updating processing based on formula (5) above.

In step S47, the displacement output unit 806 acquires the displacement information from the buffer 804 and outputs the acquired displacement information via the bus 110.

The displacement information calculation method described in the present embodiment is a mere example, and any other method may be used to calculate the displacement information. For example, the displacement information can be calculated by dividing the target image data into block regions and performing block matching on each block region. Further, displacement information can be calculated using a method in which correspondences of feature points in the target image data are interpolated to obtain correspondences of pixel positions. Further, information in any form that specifies correspondences between pixels in the target image data and the reference image data may be calculated and used as the displacement information.

(Configuration and Processing of Displacement Combination Unit 605)

The displacement combination unit 605 combines the displacement information calculated by the displacement calculation unit 604 to calculate displacement information about a displacement of a neighborhood frame from the reference image data as a reference.

In the present embodiment, as an example, displacement information about the target image data of up to four previous frames is calculated. Specifically, displacements of the neighborhood frames are calculated using image data preceding the reference image data by a plurality of (e.g., four) frames in time series.

Figure 10:
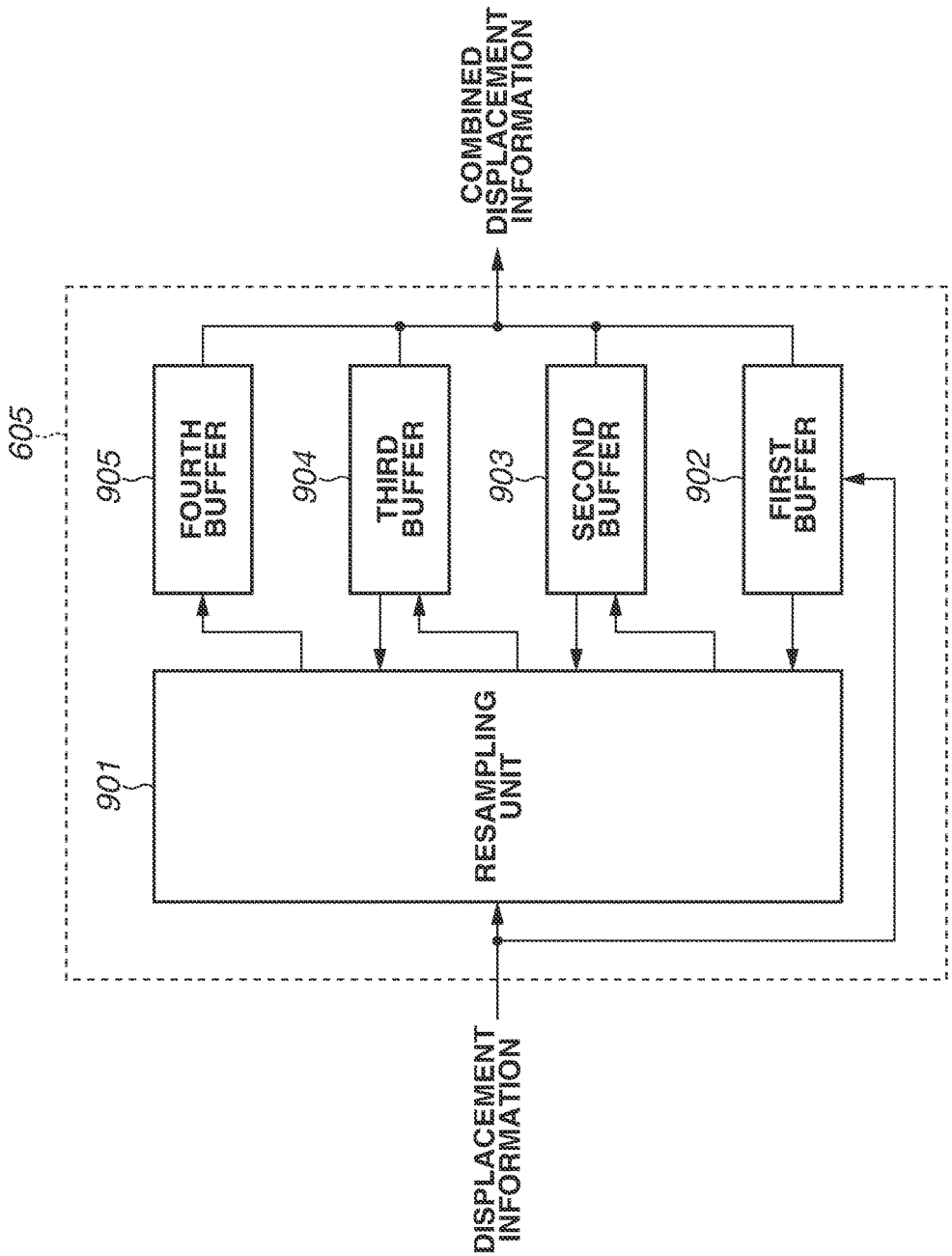
FIG. 10 is a block diagram illustrating an example of a configuration of a displacement combination unit.

FIG. 10 is a block diagram illustrating the displacement combination unit 605. The following describes an example of the configuration of the displacement combination unit 605 with reference to the block diagram.

The displacement information to be processed by the displacement combination unit 605 is in the form in which a position on a displacement destination frame (on the target image data) is specified that corresponds to a pixel position on a displacement source frame (on the reference image data). Specifically, the displacement information in the present embodiment specifies a decimal pixel position $(X_{(h,k)}, Y_{(h,k)})$ on the displacement destination frame that corresponds to an integer pixel position (h, k) on the displacement source frame. As used herein, the integer pixel position refers to a position that pixel coordinates are expressed by integers. Further, the decimal pixel position refers to a position that pixel coordinates are expressed by decimals. Values of the displacement information are not always integers.

Hereinafter, for convenience, the displacement information in a case where the displacement source frame is image data preceding the reference image data by n frames and the displacement destination frame is image data preceding the reference image data by m frames will be denoted by $X_{mn}$ and $Y_{mn}$. At this time, the same pixel position corresponds in the same frame, so a relationship represented by formula (9) below is satisfied. More specifically, image data preceding by n frames and image data also preceding by n frames are the same, so the following relationship is satisfied.

[Formula (9)]

$$(h,k)=(X_{nn(h,k)}, Y_{nn(h,k)}) \quad (9)$$

Further, the displacement calculation unit 604 calculates displacement information about image data preceding the reference image data by one frame, so the displacement information input to the displacement combination unit 605 can be described as, for example, $X_{10}$, $Y_{10}$.

More specifically, the case is represented in which the displacement source frame is image data preceding the reference image data by zero (n=0) frame and the displacement destination frame is image data preceding the reference image data by one (m=1) frame.

In a first buffer 902, a second buffer 903, a third buffer 904, and a fourth buffer 905 in FIG. 10, displacement information about image data preceding the reference image data by one frame, displacement information about image data preceding the reference image data by two frames, displacement information about image data preceding the reference image data by three frames, and displacement information about image data preceding the reference image data by four frames are respectively stored. More specifically, information specifying $X_{10}$, $Y_{10}$, $X_{20}$, $Y_{20}$, $X_{30}$, $Y_{30}$, $X_{40}$, and $Y_{40}$ is held. A resampling unit 901 resamples the displacement information based on the new displacement information acquired from the displacement calculation unit 604, and calculates displacement information from the latest reference image data as a reference to the respective frames preceding the latest reference image data by one to four frames. Various methods may be employed as resampling algorithms. Examples of algorithms that can be used include bilinear and bicubic algorithms.

As a result of the resampling based on the new frame as a reference, a displacement to a frame preceding by one frame is changed to a displacement to a frame preceding by two frames. Accordingly, the displacement information acquired as a result of resampling the displacement information stored in the first buffer 902 is stored in the second buffer 903. Similarly, the displacement information stored in the second buffer 903 is stored in the third buffer 904, and the displacement information stored in the third buffer 904 is stored in the fourth buffer 905. In other words, the displacement information stored in the first buffer 902, the displacement information stored in the second buffer 903, and the displacement information stored in the third buffer 904 at the time point at which new displacement information is input are $X_{21}$, $Y_{21}$, $X_{31}$, $Y_{31}$, $X_{41}$, and $Y_{41}$.

The resampling unit 901 resamples the information stored in the first to fourth buffers (902 to 905) using the new displacement information $X_{10}$ and $Y_{10}$ to convert the information into $X_{20}$, $Y_{20}$, $X_{30}$, $Y_{30}$, $X_{40}$, and $Y_{40}$. To simplify the description, an operation C for calculating a value m in the position (x, y) by resampling matrix data M is expressed by formula (10).

[Formula (10)]

$$m=C(x,y;M) \quad (10)$$

Further, when x and y are elements of a matrix of X and Y, an operation for arranging the results in the same matrix form is expressed by formula (11).

[Formula (11)]

$$C(X, Y; M) = \begin{pmatrix} C(X_{(0,0)}, Y_{(0,0)}; M) & C(X_{(0,1)}, Y_{(0,1)}; M) & \dots \\ C(X_{(1,0)}, Y_{(1,0)}; M) & C(X_{(1,0)}, Y_{(1,1)}; M) & \dots \\ \vdots & \vdots & \ddots \end{pmatrix} \quad (11)$$

When the operation is expressed as described above, the processing to be executed by the displacement combination unit 605 is expressed by formulas (12), (13), and (14) below.

[Formulas (12), (13), and (14)]

$$X_{20}=C(X_{10},Y_{10};X_{21})$$

$$Y_{20}=C(X_{10},Y_{10};Y_{21}) \quad (12)$$

$$X_{30}=C(X_{10},Y_{10};X_{31})$$

$$Y_{30}=C(X_{10},Y_{10};Y_{31}) \quad (13)$$

$$X_{40}=C(X_{10},Y_{10};X_{41})$$

$$Y_{40}=C(X_{10},Y_{10};Y_{41}) \quad (14)$$

After the resampling by the resampling unit 901 is completed, the displacement information based on the latest frame as a reference that is acquired from the displacement calculation unit 604 is stored in the first buffer 902. Further, the pieces of displacement information stored in the first buffer 902 to the fourth buffer 905 are output to the fluctuation correction amount calculation unit 606.

The foregoing pieces of information will be referred to as combined displacement information, or as a combined displacement. As in the case of the displacement, the combined displacement is the amount of movement of a pixel on image data.

The displacement combination unit 605 repeats the foregoing processing while holding the pieces of information stored in the first buffer 902 to the third buffer 904, thereby combining the displacements between adjacent frames to calculate displacements between neighborhood frames. When $X_{20}$, $Y_{20}$, $X_{30}$, $Y_{30}$, $X_{40}$, and $Y_{40}$ are described based on displacement information between adjacent frames, formulas (15), (16), and (17) below are obtained.

[Formulas (15), (16), and (17)]

$$X_{20}=C(X_{10},Y_{10};X_{21})$$

$$Y_{20}=C(X_{10},Y_{10};Y_{21}) \quad (15)$$

$$X_{30}=C(X_{10},Y_{10};C(X_{21},Y_{21};X_{32}))$$

$$Y_{30}=C(X_{10},Y_{10};C(X_{21},Y_{21};Y_{32})) \quad (16)$$

$$X_{40}=C(X_{10},Y_{10};C(X_{21},Y_{21};C(X_{32},Y_{32};X_{43})))$$

$$Y_{40}=C(X_{10},Y_{10};C(X_{21},Y_{21};C(X_{32},Y_{32};Y_{43}))) \quad (17)$$

FIG. 11 is a flow chart illustrating the processing performed by the displacement combination unit 605. The following describes an example of the process performed by the displacement combination unit 605 with reference to the flow chart. A CPU in the image processing unit 114 may realize processing illustrated in the flow chart by executing a predetermined program, or an image processing processor including an ASIC or the like, may execute the processing.

In step S51, the resampling unit 901 acquires displacement information calculated by the displacement calculation unit 604. In step S52, the resampling unit 901 determines whether displacement information is stored in the third buffer 904. If displacement information is stored in the third buffer 904 (YES in step S52), the processing proceeds to step S53. On the other hand, if displacement information is not stored in the third buffer 904 (NO in step S52), the processing proceeds to step S54.

In step S53, the resampling unit 901 resamples the displacement information stored in the third buffer 904 based on the displacement information acquired in step S51 and stores the resampling result in the fourth buffer 905. In step S54, the resampling unit 901 determines whether displacement information is stored in the second buffer 903. If displacement information is stored in the second buffer 903 (YES in step S54), the processing proceeds to step S55. On the other hand, if displacement information is not stored in the second buffer 903 (NO in step S54), the processing proceeds to step S56.

In step S55, the resampling unit 901 resamples the displacement information stored in the second buffer 903 based on the displacement information acquired in step S51 and stores the resampling result in the third buffer 904. In step S56, the resampling unit 901 determines whether displacement information is stored in the first buffer 902. If displacement information is stored in the first buffer 902 (YES in step S56), the processing proceeds to step S57. On the other hand, if displacement information is not stored in the first buffer 902 (NO in step S56), the processing proceeds to step S58.

In step S57, the resampling unit 901 resamples the displacement information stored in the first buffer 902 based on the displacement information acquired in step S51 and stores the resampling result in the second buffer 903.

In step S58, the displacement calculation unit 604 stores the calculated displacement information in the first buffer 902. In step S59, the displacement combination unit 605 outputs the displacement information stored in the first buffer 902, the displacement information stored in the second buffer 903, the displacement information stored in the third buffer 904, and the displacement information stored in the fourth buffer 905 to the fluctuation correction amount calculation unit 606.

(Fluctuation Correction Amount Calculation Processing)

The following describes the fluctuation correction amount calculation processing in detail. In the present embodiment, for displacements on the neighborhood image data from points on the reference image data, a fluctuation correction amount is calculated by fitting a relationship between time and displacement amount to, for example, a linear function (polynomial function). A displacement on image data preceding a point of interest by n frames is denoted by $(x_n, y_n)$. Further, gradients of the linear function in x- and y-directions are respectively denoted by $a_x$ and $a_y$, and intercepts in the x- and y-directions are respectively denoted by $b_x$ and $b_y$. At this time, in a case where the fitting is performed using a method of least squares (e.g., a procedure to determine a best fit line to data where the overall solution minimizes a sum of squares of errors made in results of every single equation), functions $E_x$ and $E_y$ to be minimized are as expressed by formulas (18) and (19) below.

[Formulas (18) and (19)]

$$E_x = \sum_{n=0}^{N-1} \|-a_x n + b_x - x_n\|_2^2 \qquad (18)$$

$$E_y = \sum_{n=0}^{N-1} \|-a_y n + b_y - y_n\|_2^2 \qquad (19)$$

In formulas (18) and (19), N (N is, for example, a positive integer) represents the number of frames used in the correction amount calculation. While the case where N=4 is described as an example in the present embodiment, a similar calculation method can be used even in a case where N is a value other than 4. Further, while n>=0 in formulas (18) and (19) in the present embodiment, a similar calculation method can be used even in a case where n<0, i.e., a case where a displacement in a frame subsequent to the reference image data is used.

Correction amounts to be obtained are intercepts $b_x$ and $b_y$, with which formulas (18) and (19) are minimized. When partial differentials of formula (18) with respect to $a_x$ and $b_x$ become zero, formula (18) has the minimum value, so a correction amount can be obtained by calculating formula (22) based on formulas (20) and (21). Similarly, a correction amount for a component in the y-direction can be obtained.

[Formulas (20), (21), and (22)]

$$2\sum_{n=0}^{N-1}(-a_x n + b_x - x_n) = 0 \qquad (20)$$

$$-2\sum_{n=0}^{N-1}(-a_x n + b_x - x_n) = 0 \qquad (21)$$

$$b_x = \frac{\sum_{n=0}^{N-1} x_n \sum_{n=0}^{N-1} n^2 - \sum_{n=0}^{N-1}(nx_n)\sum_{n=0}^{N-1} n}{\sum_{n=0}^{N-1} n^2 - \left(\sum_{n=0}^{N-1} n\right)^2} \qquad (22)$$

The calculation formulas described above are mere examples, and any equivalent calculations may be employed. Further, while the fitting is performed using the method of least squares, the fitting may be performed using any other method to estimate the correction amount.

As described above, in the present embodiment, an amount of displacement caused by the movement of a moving object is calculated by registration between adjacent frames. The calculated displacement amounts of neighborhood frames are combined (integrated), and the fitting is performed on the combined displacement amount. In this way, the movement of the moving subject can be identified, and a correction amount is calculated based on the identified movement. Accordingly, even in the case of the scene including the moving subject, a fluctuation can be corrected without a break in the scene while the movement of the moving subject is retained more accurately.

First Modified Example

Use of Subsequent Frame

While only the displacements in previous frames preceding the correction target frame are used in the correction amount calculation in the embodiment described above, displacements in subsequent frames may be used to correct an n-th frame as illustrated in FIG. 12A. Specifically, a displacement is calculated using image data subsequent to the correction target frame (one piece of image data) by a plurality of frames in time series. FIG. 12A illustrates a temporal axis obtained by extending the temporal axis of the fitting illustrated in FIG. 4A to the subsequent frames. In this case, processing from the subsequent frames to the previous frames is performed in the displacement combining processing in addition to the processing from the previous frames to the subsequent frames in the embodiment, whereby displacements of previous and subsequent neighborhood frames can be calculated.

In this case, the use of the frames subsequent to the correction target frame increases the number of frames used in the correction amount calculation, whereby the correction accuracy increases.

Second Modified Example

Function Used in Fitting

While the displacements of the pixels are fitted to the linear function in the embodiment described above as illustrated in FIG. 4B, the fitting may be performed using a zero-order function, i.e., averaging, as in FIG. 12B. Specifically, the fitting may be performed by applying, to the displacements, a time-series mean filter, where a mean filter is a sliding-window spatial filter that replaces the center value in the window with the average (mean) of all pixel values in the window. In this case, since the calculation is simplified, the processing can be performed at lower calculation costs.

Figure 13A:
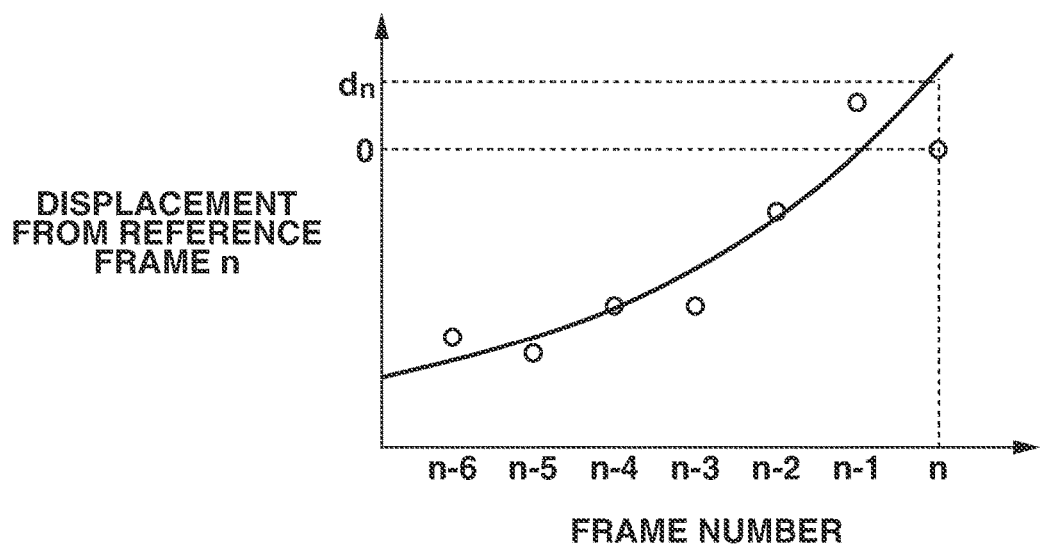
FIGS. 13A and 13B illustrate methods of filtering displacements according to second and third modified examples, respectively.

Alternatively, as illustrated in FIG. 13A, the fitting may be performed using a higher-order function (polynomial function) that is a second or higher order function. For example, to perform the fitting to a quadratic function, $c_x$ with which formulas (23) and (24) in place of formulas (18) and (19) are minimized is calculated.

[Formulas (23) and (24)]

$$E_x = \sum_{n=0}^{N-1} \|a_x n^2 - b_x n + c_x - x_n\|_2^2 \quad (23)$$

$$E_y = \sum_{n=0}^{N-1} \|a_y n^2 - b_y n + c_y - y_n\|_2^2 \quad (24)$$

In this case, complicated movements can be followed, so the movement of the moving subject is prevented from being slowed down by the fitting, whereby the movement of the moving subject can be reproduced more accurately.

Third Modified Example

Elimination of Outlier

Figure 13B:
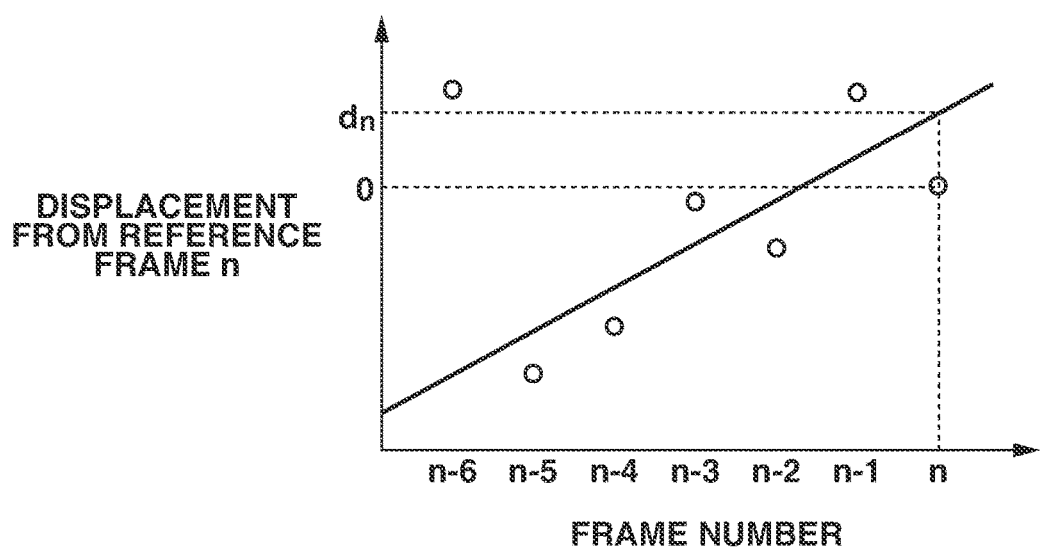

While the fitting is performed using predetermined neighborhood frames (e.g., four frames) in the embodiment described above, robust estimation—an estimation technique which is insensitive to small departures from the idealized assumptions which have been used to optimize an algorithm—may be used to eliminate outliers as illustrated in FIG. 13B. In this case, a decrease in correction accuracy due to a registration failure can be prevented.

Embodiment(s) also can be realized by execution of the following processing.

More specifically, software (program) that realizes one or more functions of the above-described embodiment(s) can be supplied to a system or apparatus via a network or various types of storage mediums. Then, a computer (e.g., CPU, micro processing unit (MPU), one or more processors) of the system or apparatus reads and executes the program to realize processing described above. Further, the processing also can be realized by a circuit (e.g., ASIC) that realizes one or more functions.

According to an embodiment, even in the case of a video image including a moving subject, fluctuations can be eliminated while a decrease in image quality is prevented.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-009159, filed Jan. 20, 2016, which is hereby incorporated by reference herein in its entirety.

What is claimed is:

1. An image processing apparatus comprising:
one or more processors; and
memory storing instructions that, when executed by the one or more processors, cause the image processing apparatus to operate as:
an acquisition unit configured to acquire a plurality of pieces of image data captured sequentially in time series, wherein three pieces of image data included in the plurality of pieces of image data are defined as first image data, second image data, and third image data in order of the time series, a first calculation unit configured to calculate first displacement information indicating, as first image data displacement, displacement between the first image data and the second image data for each pixel in the first image data and indicating, as second image data displacement, displacement between the second image data and the third image data for each pixel in the second image data, a combination unit configured to obtain second displacement information indicating a second displacement between the first image data and the third image data, wherein the second displacement information is obtained by determining, for a target pixel in the first image data, a reference position in the second image data based on first displacement information of the target pixel and by combining first displacement information of the reference position in the second image data with the first displacement information of the target pixel, a second calculation unit configured to calculate a correction amount for the target pixel in the first image data based on the second displacement information, and a correction unit configured to correct a pixel value of the target pixel in the first image data based on the calculated correction amount.

2. The image processing apparatus according to claim 1, wherein the first image data displacement, the second image data displacement, and the second displacement are calculated as an amount of movement indicating a movement of a pixel position in the plurality of pieces of image data.

3. The image processing apparatus according to claim 1, wherein the combination unit calculates the second displacement by resampling the first image data displacement and the second image data displacement one or more times based on a first image data displacement and a second image data displacement calculated for a subsequent piece of image data.

4. The image processing apparatus according to claim 1, wherein the second calculation unit calculates the correction amount by fitting the second displacement to a predetermined polynomial function.

5. The image processing apparatus according to claim 4, wherein the predetermined polynomial function is a linear function.

6. The image processing apparatus according to claim 4, wherein the predetermined polynomial function is a quadratic function.

7. The image processing apparatus according to claim 4, wherein the second calculation unit performs the fitting using a method of least squares.

8. The image processing apparatus according to claim 1, wherein the second calculation unit calculates the correction amount by applying a time-series mean filter to the second displacement.

9. The image processing apparatus according to claim 4, wherein the second calculation unit calculates the correction amount using robust estimation to eliminate an outlier.

10. The image processing apparatus according to claim 1, further comprising:
an image sensor; and
an optical system to form an image of a subject on the image sensor,
wherein, in a case where the optical system forms the image, the image sensor converts the formed image into image data.

11. A method for an image processing apparatus, the method comprising:
acquiring a plurality of pieces of image data captured sequentially in time series, wherein three pieces of image data included in the plurality of pieces of image data are defined as first image data, second image data, and third image data in order of the time series;
calculating, as a first calculation, first displacement information indicating, as first image data displacement, displacement between the first image data and the second image data for each pixel in the first image data and indicating, as second image data displacement, displacement between the second image data and the third image data for each pixel in the second image data;
obtaining second displacement information indicating a second displacement between the first image data and the third image data, wherein the second displacement information is obtained by determining, for a target pixel in the first image data, a reference position in the second image data based on first displacement information of the target pixel and by combining first displacement information of the reference position in the second image data with the first displacement information of the target pixel;
calculating, as a second calculation, a correction amount for the target pixel in the first image data based on the second displacement information; and
correcting a pixel value of the target pixel in the first image data based on the calculated correction amount.

12. A non-transitory computer-readable storage medium storing a program to cause a computer to perform a method for an image processing apparatus, the method comprising:
acquiring a plurality of pieces of image data captured sequentially in time series, wherein three pieces of image data included in the plurality of pieces of image data are defined as first image data, second image data, and third image data in order of the time series;
calculating, as a first calculation, first displacement information indicating, as first image data displacement, displacement between the first image data and the second image data for each pixel in the first image data and indicating, as second image data displacement, displacement between the second image data and the third image data for each pixel in the second image data;
obtaining second displacement information indicating a second displacement between the first image data and the third image data, wherein the second displacement information is obtained by determining, for a target pixel in the first image data, a reference position in the second image data based on first displacement information of the target pixel and by combining first displacement information of the reference position in the second image data with the first displacement information of the target pixel;
calculating, as a second calculation, a correction amount for the target pixel in the first image data based on the second displacement information; and
correcting a pixel value of the target pixel in the first image data based on the calculated correction amount.

13. The image processing apparatus according to claim 1, wherein the first image data, the second image data, and the third image data are adjacent to each other in the series among the plurality of pieces of image data.

14. The image processing apparatus according to claim 1, wherein the first calculation unit (i) calculates the first image data displacement between the first image data and the second image data by specifying corresponding pixels in the second image data with each pixel in the first image data and calculating displacement amount of the pixel position and (ii) calculates the second image data displacement between the second image data and the third image data by specifying corresponding pixels in the third image data with each pixel in the second image data and calculating displacement amount of the pixel position.

15. The image processing apparatus according to claim 1, wherein the second calculation unit calculates the correction amount for the target pixel based on the first displacement information between the first image data and the second image data calculated by the first calculation unit and the second displacement information between the first image data and the third image data calculated by the second calculation unit.

* * * * *